US010454088B2

(12) United States Patent
Budd et al.

(10) Patent No.: US 10,454,088 B2
(45) Date of Patent: Oct. 22, 2019

(54) ELECTROCHEMICAL DEVICE AND METHOD OF MAKING THE SAME

(71) Applicant: 3M INNOVATIVE PROPERTIES COMPANY, St. Paul, MN (US)

(72) Inventors: Kenton D. Budd, Woodbury, MN (US); Daimon K Heller, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 231 days.

(21) Appl. No.: 14/654,071

(22) PCT Filed: Dec. 16, 2013

(86) PCT No.: PCT/US2013/075413
§ 371 (c)(1),
(2) Date: Jun. 19, 2015

(87) PCT Pub. No.: WO2014/105483
PCT Pub. Date: Jul. 3, 2014

(65) Prior Publication Data
US 2015/0349313 A1 Dec. 3, 2015

Related U.S. Application Data

(60) Provisional application No. 61/746,210, filed on Dec. 27, 2012.

(51) Int. Cl.
H01M 2/18 (2006.01)
H01M 2/02 (2006.01)
(Continued)

(52) U.S. Cl.
CPC .............. *H01M 2/18* (2013.01); *H01G 11/10* (2013.01); *H01G 11/12* (2013.01); *H01G 11/26* (2013.01);
(Continued)

(58) Field of Classification Search
CPC .... H01M 2/18; H01M 2/0237; H01M 2/0202; H01M 4/70; H01M 2/02; H01M 10/0463;
(Continued)

(56) References Cited

U.S. PATENT DOCUMENTS 5,882,721 A 3/1999 Delnick
6,773,468 B2 8/2004 Lang
(Continued)

FOREIGN PATENT DOCUMENTS

CN 1860568 A 11/2006
CN 101517783 A 8/2009
(Continued)

OTHER PUBLICATIONS

Ho, "Tailoring Electrochemical Capacitor Energy Storage Using Direct Write Dispenser Printing", ECS Transactions, 2008, vol. 16, No. 1, pp. 35-47.
(Continued)

*Primary Examiner* — Gary D Harris
(74) *Attorney, Agent, or Firm* — Qing Han

(57) ABSTRACT

Electrochemical device (e.g., a capacitive device, a battery, or hybrid device) comprising a configuration of layers comprising at least one combination, wherein each combination comprises a porous particulate separator layer disposed between a first porous electrode layer and a second porous electrode layer, and optionally at least one particulate current collector layer, and a liquid electrolyte, wherein all the combinations, optional particulate current collector layers, and liquid electrolyte are encased in a package, and wherein essentially all the liquid electrolyte is confined within the configuration of layers. Capacitive electrochemical device comprising a first combination comprising a porous particulate separator layer disposed between a first porous electrode layer and a second porous electrode layer,
(Continued)

optionally at least one particulate current collector layer, and a liquid electrolyte.

11 Claims, 3 Drawing Sheets

(51) Int. Cl.
| | |
|---|---|
| *H01M 4/70* | (2006.01) |
| *H01G 11/26* | (2013.01) |
| *H01G 11/58* | (2013.01) |
| *H01G 11/10* | (2013.01) |
| *H01G 11/66* | (2013.01) |
| *H01G 11/86* | (2013.01) |
| *H01G 11/12* | (2013.01) |
| *H01G 11/78* | (2013.01) |
| *H01G 11/82* | (2013.01) |
| *H01G 11/84* | (2013.01) |
| *H01G 11/52* | (2013.01) |
| *H01M 10/04* | (2006.01) |
| *H01M 10/0525* | (2010.01) |
| *H01G 11/70* | (2013.01) |
| *H01M 10/0585* | (2010.01) |

(52) U.S. Cl.
CPC .............. *H01G 11/52* (2013.01); *H01G 11/58* (2013.01); *H01G 11/66* (2013.01); *H01G 11/78* (2013.01); *H01G 11/82* (2013.01); *H01G 11/84* (2013.01); *H01G 11/86* (2013.01); *H01M 2/02* (2013.01); *H01M 2/0202* (2013.01); *H01M 2/0237* (2013.01); *H01M 4/70* (2013.01); *H01M 10/0463* (2013.01); *H01M 10/0525* (2013.01); *H01G 11/70* (2013.01); *H01M 10/0585* (2013.01); *Y02E 60/13* (2013.01); *Y10T 29/49117* (2015.01)

(58) Field of Classification Search
CPC .......... H01M 10/0525; H01M 10/0585; Y10T 29/49117; Y02E 60/13; H01G 11/70; H01G 11/86; H01G 11/10; H01G 11/58; H01G 11/26; H01G 11/66; H01G 11/52; H01G 11/12; H01G 11/84; H01G 11/82; H01G 11/78

USPC ......................................................... 429/163
See application file for complete search history.

(56) References Cited

U.S. PATENT DOCUMENTS

| | | | |
|---|---|---|---|
| 6,937,460 B2 | 8/2005 | Lang | |
| 7,212,397 B2 | 5/2007 | Lang | |
| 2001/0053059 A1 | 12/2001 | Saito et al. | |
| 2002/0006546 A1 | 1/2002 | Sakata | |
| 2006/0159999 A1* | 7/2006 | Kejha | H01M 2/1673 429/254 |
| 2007/0002524 A1 | 1/2007 | Ando et al. | |
| 2009/0201629 A1 | 8/2009 | Lang | |
| 2011/0271855 A1 | 11/2011 | Eilersten | |
| 2011/0297420 A1* | 12/2011 | Gibson | H01G 11/02 174/126.1 |
| 2012/0033347 A1 | 2/2012 | Eilersten | |
| 2012/0115019 A1 | 5/2012 | Cho | |
| 2013/0045427 A1* | 2/2013 | Zhamu | H01M 4/38 429/403 |
| 2013/0122350 A1 | 5/2013 | Hagiwara et al. | |
| 2013/0335885 A1* | 12/2013 | Ginatulin | H01G 11/36 361/511 |
| 2014/0087214 A1* | 3/2014 | Amatucci | H01G 11/22 429/11 |

FOREIGN PATENT DOCUMENTS

| | | |
|---|---|---|
| EP | 0875950 | 11/1998 |
| EP | 1670008 | 6/2006 |
| JP | 2001-217165 A | 8/2001 |
| JP | 2003-282377 | 10/2003 |
| JP | 2012-33907 | 2/2012 |
| WO | 2008-038971 | 4/2008 |
| WO | WO 2011-118418 A1 | 7/2013 |

OTHER PUBLICATIONS

Singh, "Paintable Battery," Scientific Reports, Jun. 28, 2012, 5 pages.

International Search Report for PCT International Application No. PCT/US2013/075413 dated Jul. 28, 2014, 5 pages.

* cited by examiner

ELECTROCHEMICAL DEVICE AND METHOD OF MAKING THE SAME

CROSS REFERENCE TO RELATED APPLICATION

This application claims the benefit of U.S. Provisional Patent Application No. 61/746,210, filed Dec. 27, 2012, the disclosure of which is incorporated by reference herein in its entirety.

BACKGROUND

Electrochemical devices such as batteries and Electric Double Layer Capacitor (EDLC) commonly contain a sequence of functional components such as an anode, a separator, and a cathode. During charging, a negative potential is applied to the anode and a positive potential is applied to the cathode. When a device is discharged, electrons flow through an external circuit from the anode to the cathode. The anode and cathode are electrodes. A separator is used to prevent direct contact between the anode and cathode materials, such that electrons cannot conduct directly from anode to cathode within the device. Separators comprise materials with very low or negligible electronic conductivity. Electrodes and separators can be homogeneous functional materials, or composite materials comprising one or more functional materials in combination with additional materials such as binders or other fillers. In many electrochemical devices such as batteries or EDLC, the electrodes comprise particulates of the components. Other devices, such as thin film batteries or sintered solid state batteries comprise solid, monolithic electrode layers. Separators are often permeable mats or films, or similar structures, or solid state electrolyte (ion conductor) materials.

Common separators known in the art include porous films and nonwoven fiber mats. Separators in the art which contain particulates include particulate coatings coated onto a sheet of separator material (to prevent shorting if the separator melts or otherwise fails), and solid electrolytes with particulate fillers designed to improve mechanical properties, ionic conductivity, or chemical and thermal stability. In addition to conventional separators, porous particulate separators have been described for use in batteries. Batteries with liquid electrolytes are encased within a package (e.g. a can, coin cell package, pouch, or prismatic envelope). Liquid electrolyte resides within the package and permeates the separator. Liquid electrolyte is sometimes added to the package and separator, or simply to the package followed by permeation into the separator.

EDLC electrodes typically comprise substantial amounts of a high surface area carbon, such as activated carbon. During charging and discharging, ions from the electrolyte form a thin (e.g., monolayer) dielectric coating on the high surface area carbon electrode; no Faradaic reaction occurs.

Battery electrodes comprise materials which undergo Faradaic reactions during charging and discharging. For example, a lithium ion battery can comprise a lithium metal anode and a lithiated transition metal oxide cathode. During charging, lithium ions and electrons are extracted from the cathode (concurrent with oxidation of the transition metal ions), and combine at the anode to form lithium metal or other reduced lithium such as lithium in graphite.

In addition to basic symmetric EDLC devices, other capacitive devices can be constructed with an electrode that will undergo fast, reversible surface Faradaic reactions only. Such a device remains roughly capacitive-like in its electrical characteristic (charge proportional to voltage) and is therefore referred to as a pseudocapacitive device. Hence electrodes can be battery electrodes, basic EDLC electrodes, or pseudocapacitive electrodes.

Common electrochemical devices often comprise liquid electrolytes. These devices are often produced by fabricating electrodes separately, then assembling a structure around a prefabricated separator. The devices are sealed in can or pouch-like structures, and are often bulky and expensive. Solid state deposited or printed devices are also known. Generally, these devices utilize a solid state ion conductor. Such devices can be deposited by thin film methods, resulting in high cost and limited layer thickness. Alternatively, printed particulate devices can be made with solid state ion conductors. These devices can have limited rate capability and can be difficult to manufacture due to requirements for controlled humidity and other conditions.

There is a need for relatively low cost, easily manufactured devices that are customizable, flat, flexible, and have the high performance characteristics associated with liquid electrolytes.

SUMMARY

In one aspect, the present disclosure describes an electrochemical device (e.g., a capacitive device, a battery, or hybrid device) comprising a configuration of layers comprising at least one combination, wherein each combination comprises a porous particulate separator layer disposed between a first porous electrode layer and a second porous electrode layer, and optionally at least one particulate current collector layer (in some embodiments, for example, a second particulate current collector layer), and a liquid electrolyte, wherein all the combinations, optional particulate current collector layers, and liquid electrolyte are encased in a package, and wherein essentially all the liquid electrolyte is confined within the configuration of layers. In some embodiments, the electrochemical device has only one combination encased in the package, whereas in some embodiments, at least two (in some embodiments, three, four, or more) of the combinations are encased in the package.

In another aspect, the present disclosure describes a method of making an electrochemical device described herein, the method comprising:
  printing a first porous electrode layer;
  printing a porous particulate separator onto the first porous electrode layer;
  printing a second porous electrode layer onto the porous particulate separator;
  and
  infiltrating the first and second porous electrode layers and porous particulate separator with liquid electrolyte,
  wherein the method further comprises encasing at least the first and second porous electrode layers, porous particulate separator, and the liquid electrolyte in a package.

In another aspect, the present disclosure describes a capacitive electrochemical device comprising a first combination comprising a porous particulate separator layer disposed between a first porous electrode layer and a second porous electrode layer, optionally at least one particulate current collector layer (in some embodiments, for example, a second particulate current collector layer), and a liquid electrolyte. In some embodiments, the liquid electrolyte is primarily confined within pores within the device layers. In some embodiments, the liquid electrolyte is primarily confined within pores within the combinations comprising a first electrode, a porous particulate separator, and a second electrode. In some embodiments, the combination, optional particulate current collector layers, and liquid electrolyte are encased in a package, and wherein essentially all the liquid electrolyte is confined within each of the first porous electrode layer, the porous particulate separator layer, the second porous electrode layer, and optionally, any porosity within any current collector layer encased in the package.

In another aspect, the present disclosure describes a method of making a capacitive electrochemical device described herein, the method comprising:

printing (e.g., screen printing) a first porous electrode layer;

printing (e.g., screen printing) a porous particulate separator onto the first porous electrode layer;

printing (e.g., screen printing) a second porous electrode layer onto the porous particulate separator; and infiltrating the first and second porous electrode layers and porous particulate separator with liquid electrolyte.

In this application:

"Porous particulate separator layer" refers to a layer of electronically insulating material located between an anode and cathode layer, comprised of particles, pores (i.e., and pores prior to filling with liquid electrolyte), and optionally binder, wherein the ratio of particles to binder by volume is at least 60:40 (in some embodiments at least 70:30, 80:20, or even at least 90:10). The particles are typically packed so as to provide a substantial pore volume (i.e., a pore volume equal to at least 30% (in some embodiments, at least 40%, 50%, 60%, 80%, 100%, 125%, 150%, or even at least 200%) of the particle volume. In the absence of electrolyte, the layer has substantial interconnected porosity (at least 20 volume % (in some embodiments at least 30%, 40%, 50%, 60%, 70%, or even at least 80%)). The pore space may be partially or completely filled with electrolyte in a complete device.

"Porous electrode layer" refers to a functional electrochemical device electrode which, in the absence of electrolyte, comprises substantial (at least 20 volume %) interconnected pore space. The pore space may be partially or completely filled with electrolyte in a complete device.

"Essentially all the liquid electrolyte is confined within each of the first porous electrode layer, the porous particulate separator layer, the second porous electrode layer, and optionally, any porosity within any current collector layers present" means that essentially all (i.e., at least 80% (in some embodiments, at least 90%, 95%, or even at least 99%) by volume) of the liquid electrolyte in a device resides within the pores, although some of the liquid electrolyte residue might be present on the external surfaces of a configuration of device layers following infiltration and removal of excess electrolyte. "Essentially all the liquid electrolyte is confined within the configuration of layers" means that essentially all (i.e., at least 80% (in some embodiments, at least 90%, 95%, or even at least 99%) by volume) of the liquid electrolyte in a device resides within the pores within the configuration of layers, although some of the liquid electrolyte residue might be present on the external surfaces of a configuration of device layers following infiltration and removal of excess electrolyte. In contrast, liquid electrolyte devices in the art are generally immersed in a container filled with liquid electrolyte. Surprisingly, devices described herein typically do not have significant performance limitations caused by electrolyte depletion during charging and discharging.

An electrochemical cell includes an anode, a separator, a cathode, and electrolyte. Such a cell is a simple electrochemical device which can potentially perform a useful electrochemical function. Electrochemical devices include at least one electrochemical cell, and typically also include a current collector(s), substrate(s), and packaging material(s).

In some embodiments, electrochemical devices described further comprise an additional (e.g., a second, third, or more) cell (e.g., capacitive cell), wherein an additional (e.g., second) cell comprises a configuration of layers comprising at least one combination, wherein each combination of the additional (e.g., second) cell comprises a porous particulate separator layer disposed between a first porous electrode layer and a second porous electrode layer, and optionally at least one particulate current collector layer (in some embodiments, for example, a second particulate current collector layer), and a liquid electrolyte, wherein all combinations of the additional (e.g., second) cell, optional particulate current collector layers of the second capacitive cell, and liquid electrolyte of the additional (e.g., second) cell are encased in a package, and wherein essentially all the liquid electrolyte of the additional (e.g., second) cell is confined within the configuration of layers of the additional (e.g., second) cell.

Electrochemical devices described herein include capacitive device, batteries (e.g., primary or secondary batteries), and hybrid devices (i.e., an electrochemical device that contains electrodes of two different types selected from a battery, electrochemical double layer capacitors (EDLC), and pseudocapacitive electrodes). Capacitive devices include at least one capacitive or pseudocapacitive electrode.

DETAILED DESCRIPTION

Figure 1:
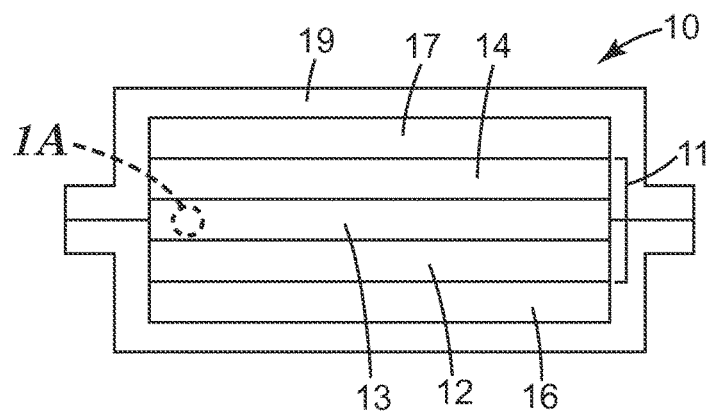
FIGS. 1 and 1A are schematic of an exemplary electrochemical device described herein.
Figure 1A:
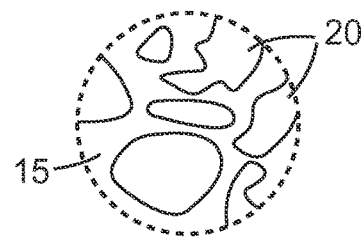

Referring to FIGS. 1 and 1A, electrochemical device 10 comprises first combination 11 comprising porous particulate separator layer 13 (with particles 20) disposed between first and second porous electrode layers 12, 14. Electrochemical device 10 also includes liquid electrolyte 15, optional particulate current collector 16, optional current collector 17, and package elements 18, 19.

Figure 2:
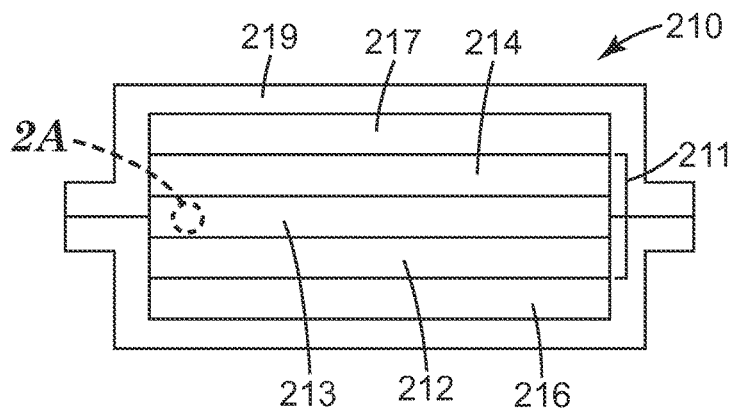
FIGS. 2 and 2A are schematic of an exemplary capacitive electrochemical device described herein.
Figure 2A:
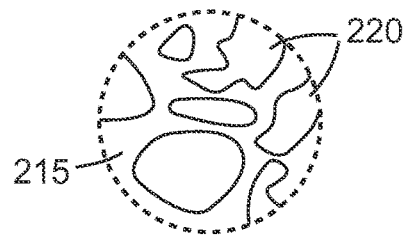

Referring to FIGS. 2 and 2A, capacitive electrochemical device 210 comprises first combination 211 comprising porous particulate separator layer 213 disposed between first capacitive porous electrode layer 212 and second porous electrode layer 214. Capacitive electrochemical device 210 also includes liquid electrolyte 215, optional particulate current collector 216, optional current collector 217, and optional package elements 218, 219.

In some embodiments, the particulate separator layer is affixed (e.g., adhered) to each of the first and second porous electrode layers. For example, the separator layer is affixed to each of the first and second porous electrode layers with adhesives such as organic or polymeric binders. In some embodiments, each layer is fabricated sequentially onto a previous layer, eliminating the need for steps such as assembly and lamination of individually fabricated layers or combinations of layers.

In some embodiments at least one of the first or second porous electrode layers is printed (e.g., screen printed).

In some embodiments, the first and second porous electrode layers each independently comprise at least 50 percent by weight high surface area carbon (i.e., 200-3000 $m^2/g$) (e.g., activated carbon), based on the total weight of the respective first and second porous electrode layer. Activated carbon materials are known in the art and typically comprise charcoal-like forms of carbon with a high volume fraction of small, interconnected pores. Activated carbon materials are available, for example, under the trade designations "YP50F" from Kuraray Chemical Co, Osaka, Japan; "MSP20" from Kansai Coke and Chemical Co, Amagasaki, Japan; "CEP16" from Power Carbon Technologies, Gumi, South Korea; and "YEC-X" from Fuzhou Yihuan Carbon Co, Fuzhou, China. EDLC electrodes typically comprise substantial amounts of a high surface area carbon, such as activated carbon, commonly present from 60-99 wt. %. Generally, the average pore size is about 1 nm to 3 nm, and the specific surface area is 500-2600 $m^2/g$. Activated carbon electrodes can further comprise, for example, electronically conductive filler (e.g., carbon black) typically present from 0-20 wt. % and a polymeric binder (e.g., polyvinylidene difluoride (PVDF), polytetrafluoroethylene, and cellulose) typically present from 1-25 wt. %. Typical ratios of activated carbon, to carbon black to binder are about 20:2:1, but ratios can be varied substantially depending on material characteristics and design objectives. For example, larger binder content can be used to increase flexibility and permit thicker electrode layers.

Other high surface area carbons useful in EDLC devices include graphene and carbon nanotubes. In some instances, these materials can provide higher electronic conductivity, higher rate capability, and enable devices without additional current collector layers.

Pseudocapacitive electrodes can comprise redox-active metal oxides such as transition metal oxides (e.g., $MnO_2$, $RuO_2$, $SnO_2$, and $PbO_2$). Oxides of Fe, Ti, Ni, Co, and other transition metals or rare earth metals can be used. Generally, high surface area forms are preferred (e.g., nanoparticles or nanowires). The oxides can be coated onto other materials such as high surface area carbons. Pseudocapacitive electrodes can further comprise, for example, binders and electrically conductive additives, as well as electrically conductive, redox active polymers such as anilines, thiophenes, and pyrroles.

Battery electrodes comprise materials which undergo Faradaic reactions during charging and discharging. Common primary cell materials include so called alkaline cell electrodes based on Zn anodes and manganese oxide cathodes. Secondary cell (re-chargeable) electrodes can include lithium ion cell chemistries such as graphite, lithium titanate, or metal alloy anodes, and lithiated transition metal oxide cathodes based on Li—Co—O, Li—Ni—O, Li—Mn—O, and various combinations of these components. Battery electrodes can also further comprise binders and electrically conductive additives.

Typically particulate materials present in electrochemical device described herein are particles or agglomerates having sizes ranging from about 0.1 micrometer to about 50 micrometers, more typically about 0.5 micrometer to about 20 micrometers. Primary particles within agglomerates, or pores, grains, and other substructures, can be smaller (e.g., as small 1 nm). Factors for choosing binder materials include process compatibility (rheology and solubility), electrolyte compatibility (wetting and insolubility), and mechanical behavior (adhesion and flexibility). In some embodiments, binder systems are tailored to be soluble in a screen printing formulation, wettable by an electrolyte solution, and inert to or insoluble in the electrolyte. In some embodiments, curable or cross linkable polymers are used. In some embodiments, hydrophobic, hydrophilic, water soluble, or solvent soluble materials are used to control the interaction of an electrode layer with an adjacent layer during device fabrication.

In some embodiments, binders remain chemically and physically (insoluble) non-reactive to the electrolyte solvents or salts over the intended voltage range of operation and provide the necessary rheology for the deposition process. In the case of screen printing, it is desirable to select binder that facilitates ink formulations that exhibit adequate viscosity and rheological response (e.g., thixotropy). To extend screen residence time, the binders preferably have adequate solubility in relatively high boiling point solvents such as glycols, ethers, and alcohols such as butanol or terpineol. In some embodiments, binders may be chemically treated to impart functional groups that increase wettability and are thereby readily wetted by the electrolyte solution. Binder and solvent systems should also wet the intended substrate, and any previous layers onto which subsequent layers are to be deposited. Thermosetting or light curable binders may also be used. Curable materials provide a method to limit binder-electrolyte interactions and increase control of layer to layer interfaces. For example, altering the temperature or duration used to cure a thermosetting binder can alter the interfacial strength of layers within the device, affecting flexibility, and overall robustness of the device.

In some embodiments, the liquid electrolyte comprises an ionic liquid, or ionic compound (e.g., salt (e.g., chlorides, nitrates, hydroxides, sulfates, and other salts of alkali or alkaline earth metals, or complex metallorganic salts such as tetra alkyl ammonium tetra fluoroborate, triflates, and fluorophosphates)) dissolved in a liquid. In some embodiments, the liquid electrolyte is aqueous, where as in some embodiments the liquid electrolyte is non-aqueous (e.g., a liquid can comprise acetonitrile or propylene carbonate).

In some embodiments, the liquid electrolyte comprises at least one of a wetting agent or surfactant, including those available under the trade designations "SILWET L-77 from Momentive Performance Materials Inc., Albany, N.Y.; and "TRITON X-100" from Dow Chemical Company, Midland, Mich.

In some embodiments, the particulate separator layer comprises non-electronically conductive and electrochemically inert particles (e.g., oxide particles and polymer particles, including porous forms thereof). Exemplary oxide particles include crystalline ceramic (e.g., alumina or magnesia) particles and amorphous silica particles. Exemplary polymer particles include polyacrylates, polyoelfins, and polycarbonate. Suitable particles may be in any of a variety of shapes and sizes, including shapes such as spheres, disks, cubes, rods, fibers, and irregular shapes, and sizes in a range from 0.3 micrometer to 50 micrometers (in some embodiments, in a range from 1 micrometer to 50 micrometers, 5 micrometers to 25 micrometers).

In some embodiments, the first and second porous electrode layers each independently have a thickness in a range from 3 micrometers to 200 micrometers (in some embodiments, in a range from 5 micrometers to 150 micrometers 5 micrometers to 100 micrometers, 10 micrometers to 100 micrometers, or even 10 micrometers to 50 micrometers).

In some embodiments, the porous particulate separator layer has a thickness in a range from 5 micrometers to 500 micrometers (in some embodiments, in a range from 10 micrometers to 100 micrometers, 10 micrometers to 75 micrometers, or even 10 micrometers to 50 micrometers).

In some embodiments, the total thickness of the first porous electrode layer, the porous particulate separator layer, and the second porous electrode layer collectively is not greater than 1000 micrometers (in some embodiments, less than 750 micrometers, or even less than 500 micrometers; in some embodiments, in a range from 50 micrometers to 1000 micrometers, 50 micrometers to 750 micrometers, 50 micrometers to 500 micrometers, 75 micrometers to 250 micrometers, or even 25 micrometers to 100 micrometers).

In some embodiments, the electrochemical device further comprises at least one current collector (more typically two current collectors). Typically at least one current collector is a particulate current collector (in some embodiments, a second current collector is a particulate current collector). Current collectors are relatively highly electronically conductive layers in contact with the functional electrochemical electrode layers. Current collectors can be used to enable high rate capability by effectively eliminating series resistance associated with electronic conduction. Typically, metals are used for current collectors, although in some embodiments other electrically conductive materials such as electrically conductive carbons can be used. Capacitive devices designed for high power capabilities typically utilize current collectors with relatively high electrical conductivity.

Generally, current collectors are essentially nonporous (i.e., porosity less than 10 vol. %, 5 vol. %, or even less than 2 vol. %). Metal foils, for example are typically dense layers of metal. Conductive inks are often formulated with sufficient matrix material (e.g., organic or polymeric material) to fill the interstices between conductive particles. Particulate current collector layers can also contain pores. In embodiments containing at least one particulate current collector layer having porosity, a liquid electrolyte is primarily confined within the pores of the device layers (e.g., the electrochemical electrodes, the porous particulate separator, and any porous current collector layers).

Particulate current collectors are useful for devices constructed of consecutively coated layers, such as printed devices, and for devices having relatively easily patterned current collectors. Particulate current collectors rely on good electrical contacts between particulates for high electrical conductivity. Typically, particulate current collectors are deposited from high loadings of inert metals such as gold or silver particles in a solvent-binder system. These systems are often referred to as "inks" or "pastes", such as silver ink. In some embodiments, electrically conductive inks also comprise copper, nickel, graphene, carbon black, or carbon nanotubes. Inks and pastes are known in the art and are available, for example, from Henkel/Acheson, Creative Materials Inc, and The Gwent Group, Pontypool, United Kingdom.

In some embodiments, at least one current collector is a foil current collector. Foil current collectors can be advantageous for providing relatively high levels of electrical conductivity, or for enabling the use of lower cost metals such as aluminum, since particle contact electrical resistance is absent. Further, a foil current collector can serve as a substrate on which subsequent layers could be coated or deposited. In addition, a foil current collector can be useful to form a moisture or vapor barrier package for a device. In other embodiments, a polymer coated metal foil is used as both a substrate and a package, wherein the foil is not used as a current collector.

In some embodiments of devices described herein, one current collector is a metal foil substrate, and all subsequent device layers including a second current collector are sequentially deposited onto the foil substrate. In multi-celled devices, multiple cells can be deposited onto a foil current collector substrate, or other substrate. Cells can then be infiltrated with liquid electrolyte, followed by folding, cutting, and stacking operations so as to physically and electrically configure individual cells into desired series and parallel configurations.

In some embodiments, multi-celled devices can be formed by sequentially printing additional layers. For example, a device with two cells in series is formed by sequentially printing a current collector, an electrode, a porous particulate separator, a second electrode, a second current collector, a third electrode, a second porous particulate separator, a fourth electrode, and a third current collector, wherein each printed layer substantially covers the previous layer to form a stack of layers. A similar device with two cells in parallel includes an electrical isolation layer and an additional current collector interposed between the second current collector and third electrode. The current collectors include tabs that contact other selected current collector layers resulting in the desired electrical configuration (e.g., two cells in parallel).

Optionally, at least one of the first or second current collectors comprises patterned openings. Embodiments of devices described herein can combine the advantages of relatively simple, flat packages, and multilayer structures, with the performance attributes provided by liquid electrolytes. For example, entire multilayer cells (e.g., first current collector, first electrode, particulate separator, second electrode, and second current collector) can be printed or deposited, followed by infiltration of electrolyte primarily into the pore spaces within the layers. Patterned openings in a current collector can enable or facilitate infiltration of the electrode. Generally, the pattern comprises connected pathways so as to provide relatively low electrical resistance and effective current collection. For example, a pattern can consist of a grid of perpendicular stripes with square openings. Generally the open area is in a range from 5% to 60% of the total area of the pattern, although other open areas may also be useful.

In some embodiments, the first and second current collectors each independently have a thickness in a range from 3 micrometers to 50 micrometers (in some embodiments, 5 micrometers to 25 micrometers).

In some embodiments, electrochemical devices described herein further comprise a substrate. For example, printed or deposited layers generally require deposition onto a substrate. The substrate can be, for example, a polymer, metal, glass, or ceramic substrate. In some embodiments, a thin, flexible substrate is preferred. Exemplary thin, flexible substrates include polymer films (e.g., polyesters (e.g., polyethylene terephthalate (PET)), polyolefins, polyacrylates), metal (e.g., aluminum, silver, nickel, brass, and titanium) foils, and laminates of polymer films or coatings with metal foils or coatings. The substrate provides a base onto which materials can be deposited. The substrate also can form part, or all, of the package in which the device is contained.

Some devices described herein comprise a package which encases a configuration of layers. A package can comprise, for example, a substrate, a coating, a layer of film, a layer of foil, or other elements useful for encasing the configuration, or combinations thereof. In some embodiments, the major outer surfaces of the outer most layers of a configuration of devices layers are essentially fully adhered to the package layers or elements. In some embodiments, regions of opposing package layers extend slightly beyond the edges of the surfaces of a configuration of device layers, and are adhered to an opposing package layer so as to seal the edges of a device.

In some embodiments, packaged device (i.e., a package and all components (e.g., porous particulate separator layer (s), porous electrode layers, current collector layer(s), liquid electrolyte encased within a package)) described herein are relatively flat. In some embodiments, the total thickness of the packaged device is less than 5 mm (in some embodiments, less than 2 mm, 1 mm, 750 micrometers, 500 micrometers, 300 micrometers, 250 micrometers, or even less than 100 micrometers; in some embodiments, in a range from 50 micrometers to 1000 micrometers, 50 micrometers to 750 micrometers, 50 micrometers to 500 micrometers, 75 micrometers to 250 micrometers, or even 25 micrometers to 100 micrometers).

In some embodiments of devices described herein including a package, a configuration of layers encased therein (including the combination(s)) has an outer major surface, wherein the package has an inner major surface, and wherein at least 90 percent adjacent outer and inner major surfaces of the configuration of layers (including the combination) and package, respectively, are adhered together. Exemplary adhesives include binders within the configuration of layers including the combination, acrylate pressure sensitive adhesives, hot melt adhesives, epoxies, and thermoplastics. For example, a configuration of layers comprises multiple layers (for example, at least electrode layers, a separator layer, optional current collector layers) each having surfaces or boundaries. Some surfaces or boundaries are within the interior of the configuration and are interfaces between layers. The configuration as a whole also has an exterior surface which is adjacent to the package elements. Typically, the exterior surface of a configuration of layers comprises two planar faces and a narrow edge.

In some embodiments, the configuration of layers within a package essentially fills the volume within the package such that there is essentially no free space within a packaged device. "Essentially no free space" means package elements are directly adjacent to and in contact with the major surfaces of the encased configuration of device layers. Free space does not include porosity within the configuration of encased device layers, or spaces resulting from bumps, wrinkles, or surface roughness or irregularities on major surfaces of the encased configuration of device layers, or adjacent package elements. Free space does include other electrolyte filled spaces external to the configuration of device layers within the package (including the layers or regions of electrolyte formed when a cell is placed into a conventional electrolyte filled container), however, spaces created by the openings of a patterned current collector are considered porosity within the configuration of layers. In some embodiments, electrochemical devices described herein have less than 1.0 cm$^3$ of free space (in some embodiments, less than 0.50 cm$^3$, 0.1 cm$^3$, 0.05 cm$^3$, or even less than 0.01 cm$^3$) of free space.

In some embodiments, packaged devices described herein with essentially no free space can be fabricated by printing. For example, a device can be fabricated by providing a substrate, and sequentially printing an optional first particulate current collector, a first porous electrode, a porous particulate separator, a second porous electrode, an optional first or second particulate current collector (e.g., with patterned openings), infiltrating electrolyte into the configuration of device layers, removing excess electrolyte, and printing a coating of sealing material over the configuration of device layers to form a package. Alternatively a layer of film or foil is placed onto the configuration of device layers and laminated or sealed to the configuration of device layers and surrounding substrate.

Liquid electrolyte is infiltrated into a configuration of cell layers of a device. Infiltration can be accomplished, for example, by immersing a configuration of cell layers into liquid electrolyte, by contacting a configuration of cell layers with a coating of liquid electrolyte or a material containing liquid electrolyte (e.g., a saturated adsorptive material), or by contacting the surface of a configuration of cell layers with drops of electrolyte. A calculated volume of electrolyte can be used such that the pore volume is not exceeded, and essentially all the electrolyte infiltrates into pores. Alternatively, for example, excess electrolyte can be removed from outer surfaces of a configuration of device layers by contacting with adsorptive material or by other techniques such as, for example, sweeping it away with an air knife.

In some embodiments, the package can be formed using a vacuum heat seal process wherein the cell is placed within a bag of heat sealable film, the gas from within the bag is evacuated and a peripheral region around the cell is heat sealed.

In some embodiments, a plurality of cells can be formed on a sheet of substrate material by, for example, printing. In some embodiments, the substrate material comprises heat sealable material, adhesive material, or otherwise seal. In other embodiments, cells or devices deposited or printed onto a substrate comprise an overcoat of sealing material. For example, a multilayer device described herein can be printed, infiltrated with electrolyte, follow by printing or deposition of an additional layer of material to seal the device.

In some embodiments, multiple cells can be deposited on a common substrate. The substrate can be cut or folded along regions between the cells to enable desired physical and electrical configurations of cells, or to seal individual cells or combinations of cells within the substrate material. For example, a folding operation can be performed that brings the top face of adjacent cells in contact with one another, electrically connecting two cells in series or parallel (depending on cell geometry) prior to sealing the device. Furthermore, series or parallel combinations of cells can be further connected electrically using mechanical attachment (e.g., rivets) to change the properties of the device (e.g., capacitance and equivalent series resistance) without modifying the device footprint. In some embodiments, cells are deposited on both opposed major surfaces of a substrate.

In some embodiments, the substrate forms a package encasing at least the first porous electrode layer, the porous particulate separator layer, the second porous electrode layer, and the liquid electrolyte. In some embodiments, at least the first porous electrode layer, the porous particulate separator layer, the second porous electrode layer, and the liquid electrolyte are collectively encased in a package. In some embodiments, the package is a hermetic package. For example, the hermetic enclosure can comprise metal foil such as those described above In some embodiments, additional electrically insulating layers may be deposited (e.g., by screen printing) to prevent an unwanted electrical connection when forming series or parallel combinations.

In some embodiments, electrochemical devices described herein are flexible (i.e., can be bent on an arc on less than a 1 meter (in some embodiments, less than 75 cm, 50 cm, 25 cm, 10 cm, 5 cm, or even less than 1 cm) radius without visibly cracking with the naked eye having 20:20 vision.

A wide variety of layer geometries can be utilized, but the geometry of electrode, separator, and current collector layers are typically designed such that the anode and cathode of a cell remain electrically isolated. For symmetric devices, first and second electrode layers are typically the same. For asymmetric devices, first and second electrode layers generally have the same footprint, but may differ in layer thickness to account for the different charge storage properties of the materials. In a simplified case where all layers of a fully printed device have the same geometric shape (e.g., squares), first and second electrodes are the same, and first and second current collectors are the same, the electrode and current collector layers can have a geometric footprint no larger than that of the separator. In some embodiments, the separator layer is designed to extend beyond the printed electrode and printed current collector regions to account for any errors in printing registration, ensuring electrical isolation between anode and cathode is maintained.

Particulate current collectors have lower conductivity than metal foils of comparable thickness, resulting in the potential for current collector to contribute significantly to the cell resistance. Lowering the aspect ratio of a printed region and/or increasing the areal fraction of electrode area immediately adjacent to a current collector surface (in cases where a patterned current collector is used (i.e., a printed current collector with open, liquid permeable regions, and connected, conductive regions)) can be advantageous for lowering cell resistance with concomitant increase in power capability.

Layers can be deposited by a variety of methods including spraying, knife coating, and printing (e.g., screen printing). Screen printing, for example, enables patterning of device layers, and provides desirable layer thicknesses. Layer compositions and inks are formulated to provide desired print quality with low defects, adhesion to and compatibility with adjacent layers, and compatibility with the electrolyte. In some embodiments, devices are fully printed (i.e., a substrate is provided, and all additional electrode and current collector layers are sequentially printed onto the substrate). Many devices layers can be simultaneously printed by, for example, screen printing. Devices layers can be continuously fabricated onto a moving substrate by "roll to roll" printing methods such as continuous screen printing.

Cells, devices, and processes described herein can be particularly effective for forming aqueous or non-aqueous devices. Non-aqueous devices, for example, can be fully printed in an ambient environment (i.e., uncontrolled room environments having a relative humidity greater than 5%), then dried, infiltrated and sealed in a dry environment (i.e., less than 5% relative humidity).

Aqueous and non-aqueous device chemistries can have certain advantages and disadvantages, and each may be preferred in different situations for various reasons. For example, aqueous device chemistries can result in simplified manufacturing such as ability to manufacture in ambient humidity. However, aqueous systems may have lower voltage limits due to undesired electrochemical reactions. For example, aqueous EDLC cells are generally limited to about 1.0 volt, above which dissociation of water can occur. Pseudocapacitive chemistries typically enable higher voltage and higher capacity. For example, cells with a $MnO_2$ cathode and an activated carbon cathode can be stable up to about 2.0 V.

In relatively high voltage (e.g., above about 1 V) aqueous cells, there may be unwanted electrochemical reactions involving the current collectors. In some embodiments, the current collector is a protected current collector. For example, a current collector can be fabricated by coating a printed or a foil metallic current collector layer with a conductive carbon ink layer. The metallic layer provides relatively low electrical sheet resistance, and an electrically conductive carbon ink layer provides improved electrochemical inertness. A protected current collector with patterned openings can comprise a patterned metal containing layer registered with a similarly patterned carbon containing layer.

A first or second current collector can have sequential layers of metal and carbon ink such that the carbon ink layer is adjacent to an electrochemical electrode. In some embodiments, a first protected current collector comprises a metal containing layer on a substrate with a carbon containing layer on the metal containing layer. A combination of a first electrochemical electrode, a particulate porous separator, and a second electrochemical electrode are coated onto the carbon containing layer. Optionally, a second carbon containing layer is coated onto the combination, and a second metal containing layer is coated onto the carbon containing layer, forming a second protected current collector. Cells and devices described herein can have 0, 1, 2, or more protected current collectors.

Non-aqueous chemistries can allow EDLC devices with higher voltage (typically at least 2.5 V), and high voltage (typically at least 3.5 V) battery chemistries such as lithium ion. An advantage of some embodiments is to enable printing of entire non-aqueous devices in ambient conditions, followed by a final drying, infiltration, and packaging in a dry environment.

Typically, electrochemical devices described herein can be made, for example by a method comprising:
  printing a first porous electrode layer;
  printing a porous particulate separator onto the first porous electrode layer;
  printing a second porous electrode layer onto the porous particulate separator; and infiltrating the first and second porous electrode layers and porous particulate separator with liquid electrolyte, wherein the method further comprises encasing at least the first and second porous electrode layers, porous particulate separator, and the liquid electrolyte in a package.

For electrochemical devices further comprising a first current collector printing the first porous electrode layer can comprise printing the first porous electrode layer onto the first current collector layer. For electrochemical devices further comprising a second current collector the method can further comprise printing the second current collector onto the second porous electrode layer prior to infiltrating the first and second porous electrode layers and porous particulate separator with the liquid electrolyte. In some embodiments a plurality of electrochemical devices are made simultaneously which includes for each printing, simultaneously printing the respective layer for each device.

Uses of electrochemical device described herein include as a capacitive device, as a battery (e.g., a primary or secondary battery), and as a hybrid device.

In some embodiments, a combination is a capacitive cell. Exemplary capacitive electrochemical devices and capacitive cells described herein have a total capacitance in a range from 1 millifarad to 5000 millifarads (in some embodiments, 5 millifarads to 5000 millifarads, 20 millifarads to 2000 millifarads, or even 30 millifarads to 1000 millifarads). Exemplary capacitive electrochemical devices and capacitive cells have a (cell) voltage after fully charging (i.e., applying a voltage and current resulting in a charged capacitive at a selected maximum voltage for which the device is stable; such a voltage is one for which there is an absence of unwanted electrochemical reactions that result in degradation or self discharge of the device) typically in a range from 0.5 volt to 5 volts (in some embodiments, 1.2 volt to 5 volts, 1.2 volt to 3 volts, 1.2 volt to 2.5 volts, or even 3 volts to 5 volts)). Exemplary capacitive electrochemical devices and capacitive cells have a stable voltage after charging (i.e., the device having a leakage current less than 100 microA (in some embodiments, less than 10 microA).

In some embodiments, electrochemical devices described herein that comprise a capacitive cell may further comprise an additional (e.g., a second, third, or more) capacitive cell. In some embodiments, the additional capacitive cell(s) comprises an additional (e.g., a second, third, or more) combination comprising a porous particulate separator layer disposed between first porous electrode layer and a second porous electrode layer, and optionally at least one particulate current collector layer (in some embodiments, for example, a second particulate current collector layer), and a liquid electrolyte, wherein the combinations, optional particulate current collector layers, and liquid electrolyte are encased in a package, and wherein essentially all the liquid electrolyte is confined within each of the first porous electrode layers, the porous particulate separator layers, the second porous electrode layers, and optionally, any porosity within any current collector layers encased in the package.

Electrochemical devices comprising multiple capacitive cells can have the capacitive cells electrically connected in parallel, series, or a combination thereof.

Capacitive devices such as EDLC or hybrid devices typically have relatively extremely high surface area electrode materials. Even a monolayer of ions covering such a large surface area represents a substantial amount of ions from an electrolyte. Capacitive devices are also known to be used for, and useful for, applications requiring high power compared with batteries. Some porous particulate separators have limited porosity or high tortuosity, potentially limiting the ionic conductivity of a device. Hence porous particulate separators have typically been described in association with battery type electrochemical devices. It is surprising that high power capacitive devices with high surface area electrodes can be made having a porous particulate separator, and optionally at least one particulate current collector layer (in some embodiments, for example, a second particulate current collector layer), and a liquid electrolyte, wherein the combination, optional particulate current collector layers, and liquid electrolyte are encased in a package, and wherein essentially all the liquid electrolyte is confined within each of the first porous electrode layer, the porous particulate separator layer, the second porous electrode layer, and optionally, any porosity within any current collector layer encased in the package.

In some embodiments a capacitive electrochemical device comprises a first combination comprising a porous particulate separator layer disposed between a first porous electrode layer and a second porous electrode layer, optionally at least one particulate current collector layer (in some embodiments, for example, a second particulate current collector layer), and a liquid electrolyte.

In some embodiments, a capacitive electrochemical device comprises a first combination comprising a porous particulate separator layer disposed between a first porous electrode layer and a second porous electrode layer, and optionally at least one particulate current collector layer (in some embodiments, for example, a second particulate current collector layer), and a liquid electrolyte, wherein the combination, optional particulate current collector layers, and liquid electrolyte are encased in a package, and wherein essentially all the liquid electrolyte is confined within each of the first porous electrode layer, the porous particulate separator layer, the second porous electrode layer, and optionally, any porosity within any current collector layer encased in the package.

EXEMPLARY EMBODIMENTS

1A. An electrochemical device comprising a configuration of layers comprising at least one combination, wherein each combination comprises a porous particulate separator layer disposed between a first porous electrode layer and a second porous electrode layer, and optionally at least one particulate current collector layer (in some embodiments, for example, a second particulate current collector layer), and a liquid electrolyte, wherein all the combinations, optional particulate current collector layers, and liquid electrolyte are encased in a package, and wherein essentially all the liquid electrolyte is confined within the configuration of layers.

2A. The electrochemical device of Exemplary Embodiment 1A having only one combination encased in the package.

3A. The electrochemical device of Exemplary Embodiment 1A having at least two (in some embodiments, three, four, or more) of the combinations encased in the package.

4A. The electrochemical device of any preceding A Exemplary Embodiments, wherein the configuration of layers has an outer major surface, wherein the package has an inner major surface, and wherein at least 90 percent of the outer major surface of the configuration of layers is adhered to the adjacent inner major surface of the package.

5A. The electrochemical device of any preceding A Exemplary Embodiments, wherein there is essentially no free space within the package.

6A. The electrochemical device of any preceding A Exemplary Embodiments having less than 1.0 $cm^3$ of free space (in some embodiments, less than 0.50 $cm^3$, 0.1 $cm^3$, 0.05 $cm^3$, or even less than 0.01 $cm^3$) of free space.

7A. The electrochemical device of any preceding A Exemplary Embodiments, wherein the particulate separator layer of at least one combination is affixed (e.g., adhered) to each of the first and second porous electrode layers of the respective combination.

8A. The electrochemical device of any preceding A Exemplary Embodiments, wherein each first and second porous electrode layer each independently comprise at least 50 percent by weight high surface area carbon (e.g., activated carbon), based on the total weight of the respective first and second porous electrode layers.

9A. The electrochemical device of any preceding A Exemplary Embodiments, wherein the liquid electrolyte comprises ionic compound (e.g., salt (e.g., potassium nitrate, sodium, and tetra alkyl ammonium compound)) dissolved in a liquid.

10A. The electrochemical device of any preceding A Exemplary Embodiments, wherein the liquid electrolyte is an ionic liquid.

11A. The electrochemical device of any preceding A Exemplary Embodiments, wherein the liquid electrolyte is aqueous.

12A. The electrochemical device of any of Exemplary Embodiments 1A to 10A, wherein the liquid electrolyte is non-aqueous (in some embodiments, comprises acetonitrile or propylene carbonate).

13A. The electrochemical device of any preceding A Exemplary Embodiments, wherein the liquid electrolyte comprises at least one of a wetting agent or a surfactant.

14A. The electrochemical device of any preceding A Exemplary Embodiments, wherein the particulate separator layer of at least one combination comprises non-electronically conductive and electrochemically inert particles (e.g., oxide particles and polymer particles, including porous forms thereof).

15A. The electrochemical device of any preceding A Exemplary Embodiments, wherein the particulate of the particulate separator layer of at least one combination include at least one of crystalline ceramic particles or amorphous silica particles.

16A. The electrochemical device of any preceding A Exemplary Embodiments, wherein the particulate of the particulate separator layer of at least one combination has particle sizes in a range from 0.3 micrometer to 50 micrometers (in some embodiments, in a range from 1 micrometer to 50 micrometers, 5 micrometers to 25 micrometers).

17A. The electrochemical device of any preceding A Exemplary Embodiments, wherein the first and second porous electrode layers of at least one combination each independently have a thickness in a range from 3 micrometers to 200 micrometers (in some embodiments, in a range from 5 micrometers to 150 micrometers 5 micrometers to 100 micrometers, 10 micrometers to 100 micrometers, or even 10 micrometers to 50 micrometers).

18A. The electrochemical device of any preceding A Exemplary Embodiments, wherein the porous particulate separator layer of at least one combination has a thickness in a range from 5 micrometers to 500 micrometers (in some embodiments, in a range from 10 micrometers to 100 micrometers, 10 micrometers to 75 micrometers, or even 10 micrometers to 50 micrometers).

19A. The electrochemical device of any preceding A Exemplary Embodiments, wherein the total thickness of the first porous electrode layer, the porous particulate separator layer, and the second porous electrode layer of at least one combination collectively is not greater than 1000 micrometers (in some embodiments, less than 750 micrometers, or even less than 500 micrometers; in some embodiments, in a range from 50 micrometers to 1000 micrometers, 50 micrometers to 750 micrometers, 50 micrometers to 500 micrometers, 75 micrometers to 250 micrometers, or even 25 micrometers to 100 micrometers).

20A. The electrochemical device of any preceding A Exemplary Embodiments having a packaged device thickness less than 5 mm (in some embodiments, less than 2 mm, 1 mm, 750 micrometers, 500 micrometers, 300 micrometers, 250 micrometers, or even less than 100 micrometers; in some embodiments, in a range from 50 micrometers to 1000 micrometers, 50 micrometers to 750 micrometers, 50 micrometers to 500 micrometers, 75 micrometers to 250 micrometers, or even 25 micrometers to 100 micrometers).

21A. The electrochemical device of any preceding A Exemplary Embodiments further comprising a substrate.

22A. The electrochemical device of Exemplary Embodiment 21A, wherein the substrate forms the package.

23A. The electrochemical device of Exemplary Embodiment 22A, wherein the package is hermetic.

24A. The electrochemical device of any preceding A Exemplary Embodiments, wherein the package comprises metal foil.

25A. The electrochemical device of Exemplary Embodiment 23A, wherein the metal foil is a current collector.

26A. The electrochemical device of any preceding A Exemplary Embodiments, wherein at least one of the first or second porous electrode layers is printed.

27A. The electrochemical device of any preceding A Exemplary Embodiments comprising at least one particulate current collector.

28A. The electrochemical device of any preceding A Exemplary Embodiments, further comprising at least one foil current collector.

29A. The electrochemical device of any A Exemplary Embodiments comprising a first current collector and second current collector, wherein at least the first porous electrode layer, the porous particulate separator layer, the second porous electrode layer, and the liquid electrolyte are disposed between the first and second current collectors.

30A. The electrochemical device of Exemplary Embodiment 29A, wherein at least one of the first or second current collectors is a particulate current collector.

31A. The electrochemical device of Exemplary Embodiment 30A, wherein the particulate of a particulate current collector independently includes at least one of silver particles, copper particles, nickel particles, or carbon particles).

32A. The electrochemical device of any of Exemplary Embodiments 29A to 31A, wherein at least one of the first or second current collectors comprises patterned openings.

33A. The electrochemical device of any of Exemplary Embodiments 29A to 32A, wherein the first and second current collectors each independently have a thickness in a range from 3 micrometers to 50 micrometers (in some embodiments, 5 micrometers to 20 micrometers).

34A. The electrochemical device of any preceding A Exemplary Embodiments, wherein the electrochemical device is flexible.

35A. The electrochemical device of any preceding A Exemplary Embodiments, wherein at least one combination is a capacitive cell.

36A. The electrochemical device of Exemplary Embodiment 35A, wherein the capacitive cell has a total capacitance in a range from 1 millifarad to 5000 millifarads (in some embodiments, 5 millifarads to 5000 millifarads, 20 millifarads to 2000 millifarads, or even 30 millifarads to 1000 millifarads).

37A. The electrochemical device of either Exemplary Embodiment 35A or 36A, wherein the capacitive cell has a cell voltage after fully charging in a range from 0.5 volt to 5 volts (in some embodiments, 1.2 volt to 5 volts, 1.2 volt to 3 volts, 1.2 volt to 2.5 volts, or even 3 volts to 5 volts).

38A. The electrochemical device of any of Exemplary Embodiments 35A to 37A, wherein the capacitive cell has a stable voltage after charging.

39A. The electrochemical device of any of Exemplary Embodiments 35A to 38A further comprising a second capacitive cell comprising a configuration of layers comprising at least one combination, wherein each combination of the second capacitive cell comprises a porous particulate separator layer disposed between a first porous electrode layer and a second porous electrode layer, and optionally at least one particulate current collector layer (in some embodiments, for example, a second particulate current collector layer), and a liquid electrolyte, wherein all combinations of the second capacitive cell, optional particulate current collector layers of the second capacitive cell, and liquid electrolyte of the second capacitive cell are encased in a package, and wherein essentially all the liquid electrolyte of the second capacitive cell is confined within the configuration of layers of the second capacitive cell.

40A. The electrochemical device of Exemplary Embodiment 39A, wherein the capacitive cells are electrically connected in parallel.

41A. The electrochemical device of Exemplary Embodiment 39A, wherein the capacitive cells are electrically connected in series.

42A. The electrochemical device of Exemplary Embodiment 39A further comprising additional capacitive cells, wherein some of the capacitive cells are electrically connected in parallel, and some of the capacitive cells are electrically connected in series.

43A. The electrochemical device of any preceding A Exemplary Embodiments that is a capacitive device.

44A. The electrochemical device of any of Exemplary Embodiments 1A to 42A that is a hybrid device.

45A. The electrochemical device of any of Exemplary Embodiments 1A to 42A that is a battery (e.g., a primary or secondary battery).

46A. A method of making the electrochemical device of any of A Exemplary Embodiments, the method comprising:
    printing (e.g., screen printing) a first porous electrode layer;
    printing (e.g., screen printing) a porous particulate separator onto the first porous electrode layer;
    printing (e.g., screen printing) a second porous electrode layer onto the porous particulate separator; and
    infiltrating the first and second porous electrode layers and porous particulate separator with liquid electrolyte,
    wherein the method further comprises encasing at least the first and second porous electrode layers, porous particulate separator, and the liquid electrolyte in a package.

47A. The method of Exemplary Embodiment 46A, wherein printing the first porous electrode layer comprises printing (e.g., screen printing) the first porous electrode layer onto a first current collector layer.

48A. The method of either Exemplary Embodiment 46A or 47A, further comprising printing (e.g., screen printing) a second current collector onto the second porous electrode layer prior to infiltrating the first and second porous electrode layers and porous particulate separator with the liquid electrolyte, and wherein at least one of the first or second current collectors is patterned with open regions to enable infiltration of the liquid electrolyte into the porous layers.

49A. A method of making a plurality of electrochemical device of any of Exemplary Embodiments 1A to 45A, the method comprising:
    printing (e.g., screen printing) (typically simultaneously printing) a first porous electrode layer for each respective device;
    printing (e.g., screen printing) (typically simultaneously printing) a porous particulate separator onto the first porous electrode layer for each respective device;
    printing (e.g., screen printing) (typically simultaneously printing) a second porous electrode layer onto the porous particulate separator for each respective device; and
    infiltrating the first and second porous electrode layers and porous particulate separator of each respective device with liquid electrolyte,
    wherein the method further comprises encasing at least the first and second porous electrode layers, porous particulate separator, and the liquid electrolyte for each respective device in a package.

50A. The method of Exemplary Embodiment 49A, wherein printing (e.g., screen printing) the first porous electrode layer comprises for each respective device printing the first porous electrode layer onto a first current collector layer.

51A. The method of either Exemplary Embodiment 49A or 50A, further comprising for each respective device printing (e.g., screen printing) a second current collector onto the second porous electrode layer prior to infiltrating for each respective device the first and second porous electrode layers and porous particulate separator with the liquid electrolyte, and wherein at least one of the first or second current collectors for each respective device is patterned with open regions to enable infiltration of the liquid electrolyte into the porous layers.

1B. A capacitive electrochemical device comprising a first combination comprising a porous particulate separator layer disposed between a first porous electrode layer and a second porous electrode layer, optionally at least one particulate current collector layer, and a liquid electrolyte.

2B. The capacitive electrochemical device of Exemplary Embodiment 1B, wherein the particulate separator layer is affixed (e.g., adhered) to each of the first and second porous electrode layers.

3B. The capacitive electrochemical device of either Exemplary Embodiment 1B or 2B, wherein the first and second porous electrode layers each independently comprise at least 50 percent by weight high surface area carbon (e.g., activated carbon), based on the total weight of the respective second porous electrode layer.

4B. The capacitive electrochemical device of any preceding B Exemplary Embodiments, wherein the liquid electrolyte comprises ionic compound (e.g., salt (e.g., potassium nitrate, sodium, and tetra alkyl ammonium compound)) dissolved in a liquid.

5B. The capacitive electrochemical device of any preceding B Exemplary Embodiments, wherein the liquid electrolyte is an ionic liquid.

6B. The capacitive electrochemical device of any preceding B Exemplary Embodiments, wherein the liquid electrolyte is aqueous.

7B. The capacitive electrochemical device of any of Exemplary Embodiments 1B to 5B, wherein the liquid electrolyte is non-aqueous (in some embodiments, comprises acetonitrile or propylene carbonate).

8B. The capacitive electrochemical device of any preceding B Exemplary Embodiments, wherein the liquid electrolyte comprises at least one of a wetting agent or surfactant.

9B. The capacitive electrochemical device of any preceding B Exemplary Embodiments, wherein the particulate separator layer comprises non-electronically conductive and electrochemically inert particles (e.g., oxide particles and polymer particles, including porous forms thereof).

10B. The capacitive electrochemical device of any preceding B Exemplary Embodiments, wherein the particulate of the particulate separator layer include a at least one of crystalline ceramic particles or amorphous silica particles.

11B. The capacitive electrochemical device of any preceding B Exemplary Embodiments, wherein the particulate of the particulate separator layer has particle sizes in a range from 0.3 micrometer to 50 micrometers (in some embodiments, in a range from 1 micrometer to 50 micrometers, 5 micrometers to 25 micrometers).

12B. The capacitive electrochemical device of any preceding B Exemplary Embodiments, wherein the total thickness of the first porous electrode layer, the porous particulate separator layer, and the second porous electrode layer collectively is not greater than 1000 micrometers (in some embodiments, less than 750 micrometers, or even less than 500 micrometers; in some embodiments, in a range from 50 micrometers to 1000 micrometers, 50 micrometers to 750 micrometers, 50 micrometers to 500 micrometers, 75 micrometers to 250 micrometers, or even 25 micrometers to 100 micrometers).

13B. The capacitive electrochemical device of any preceding B Exemplary Embodiments having a packaged device thickness less than 5 mm (in some embodiments, less than 2 mm, 1 mm, 750 micrometers, 500 micrometers, 300 micrometers, 250 micrometers, or even less than 100 micrometers; in some embodiments, in a range from 50 micrometers to 1000 micrometers, 50 micrometers to 750 micrometers, 50 micrometers to 500 micrometers, 75 micrometers to 250 micrometers, or even 25 micrometers to 100 micrometers).

14B. The capacitive electrochemical device of any preceding B Exemplary Embodiments having a total capacitance in a range from 1 millifarad to 5000 millifarads (in some embodiments, 5 millifarads to 5000 millifarads, 20 millifarads to 2000 millifarads, or even 30 millifarads to 1000 millifarads).

15B. The capacitive electrochemical device of any preceding B Exemplary Embodiments having a voltage after fully charging in a range from 0.5 volt to 5 volts (in some embodiments, 1.2 volt to 5 volts, 1.2 volt to 3 volts, 1.2 volt to 2.5 volts, or even 3 volts to 5 volts).

16B. The capacitive electrochemical device of any preceding B Exemplary Embodiments having a stable voltage after charging.

17B. The capacitive electrochemical device of any preceding B Exemplary Embodiments further comprising a substrate.

18B. The capacitive electrochemical device of Exemplary Embodiment 17B, wherein the substrate forms a package encasing at least the first porous electrode layer, the porous particulate separator layer, the second porous electrode layer, and the liquid electrolyte.

19B. The capacitive electrochemical device of Exemplary Embodiment 18B, wherein package is a hermetic package.

20B. The capacitive electrochemical device of any preceding B Exemplary Embodiments, wherein at least one of the first or second porous electrode layers is printed.

21B. The capacitive electrochemical device of any preceding B Exemplary Embodiments, further comprising at least one particulate current collector.

22B. The capacitive electrochemical device of any preceding B Exemplary Embodiments, further comprising at least one foil current collector.

23B. The capacitive electrochemical device of Exemplary Embodiment 22B, wherein the foil current collector is a substrate.

24B. The capacitive electrochemical device of any preceding B Exemplary Embodiments, further comprises a first current collector and second current collector, wherein at least the first porous electrode layer, the porous particulate separator layer, the second porous electrode layer, and the liquid electrolyte are disposed between the first and second current collectors.

25B. The capacitive electrochemical device of Exemplary Embodiment 24B, wherein at least one of the first or second current collectors is a particulate current collector.

26B. The capacitive electrochemical device of Exemplary Embodiment 25B, wherein the particulate of a particulate current collector independently includes at least one of silver particles, copper particles, nickel particles, or carbon particles).

27B. The capacitive electrochemical device of any of Exemplary Embodiments 24B to 26B, wherein at least one of the first or second current collectors comprises patterned openings.

28B. The capacitive electrochemical device of any of Exemplary Embodiments 24B to 27B, wherein the first and second current collectors each independently have a thickness in a range from 3 micrometers to 50 micrometers (in some embodiments, 5 micrometers to 20 micrometers).

29B. The capacitive electrochemical device of any preceding B Exemplary Embodiments, wherein the electrochemical device is flexible.

30B. A method of making the capacitive electrochemical device of any preceding B Exemplary Embodiments, the method comprising:

printing (e.g., screen printing) a first porous electrode layer;

printing (e.g., screen printing) a porous particulate separator onto the first porous electrode layer;

printing (e.g., screen printing) a second porous electrode layer onto the porous particulate separator; and infiltrating the first and second porous electrode layers and porous particulate separator with liquid electrolyte.

31B. The method of Exemplary Embodiment 30B, wherein printing the first porous electrode layer comprises printing (e.g., screen printing) the first porous electrode layer onto a first current collector layer.

32B. The method of either Exemplary Embodiment 30B or 31B, further comprising printing (e.g., screen printing) a second current collector onto the second porous electrode layer prior to infiltrating the first and second porous electrode layers and porous particulate separator with the liquid electrolyte, and wherein at least one of the first or second current collectors is patterned with open regions to enable infiltration of the liquid electrolyte into the porous layers.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Materials

Unless otherwise noted, all chemicals were obtained from, or are available from, chemical suppliers such as Aldrich Chemical Company, Milwaukee, Wis. The following is a list of materials used throughout the Examples, as well as their brief descriptions and origins.

| Designation | Description | Obtained from |
| --- | --- | --- |
| YP-50F | Activated carbon for supercapacitors | Kuraray America Inc., Houston, TX under the trade designation "YP-50F" |

| Designation | Description | Obtained from |
| --- | --- | --- |
| ETHOCEL STANDARD 300 | Ethylcellulose | Dow Chemical Company, Midland, MI under the trade designation "ETHOCEL STANDARD 300" |
| TERPINEOL | Monoterpene alcohol | J. T. Baker Chemicals, Avantor Performance Materials, Center Valley, PA under the trade designation "TERPINEOL" |
| Ethanol | | EMD Chemicals, Merck KGaA, Darmstadt, Germany |
| SUPER P CONDUCTIVE CARBON BLACK | Conductive carbon black | Timcal Graphite and Carbon, Westlake, OH |
| CABOSIL M5 | Fumed silica | Cabot Corporation, Boston, MA under the trade designation "CABOSIL M5" |
| AC34B4 | Calcined alumina | Rio Tinto Alcan Specialty Aluminas, Cleveland, OH under the trade designation "AC34B4" |
| Zn Powder | ~50 micrometer particles size | Grillo-Werke AG, Chemicals Division, Duisburg, Germany |
| Diacetone alcohol | | Aldrich Chemical Company, Milwaukee, WI |
| $MnO_2$ | −325 mesh, 99.9% | Alfa-Aesar, Ward Hill, MA |
| 479SS | Acheson conductive silver ink | Henkel International, Irvine, CA under the trade designation "479SS" |
| PF-407C | Acheson conductive carbon ink | Henkel International under the trade designation "PF-407C" |
| SILWET L-77 | Surfactant | Momentive Performance Materials Inc., Albany, NY under the trade designation "SILWET L-77" |
| ALCONOX | A commercial detergent | Alconox Inc., White Plains, NY under the trade designation "ALCONOX" |
| SCOTCHPAK HB-P-69731 TRANSLUCENT HIGH BARRIER FILM | A polyester (PET) base film with a heat sealable ethylene vinyl acetate (EVA) copolymer layer, containing an AlOx ceramic oxide coating | 3M Company, St. Paul, MN under the trade designation "SCOTCHPAK HB-P-69731 TRANSLUCENT HIGH BARRIER FILM" |

Preparative Example A (PE-A)

Preparation of Printable Electrode Ink-1

2.28 grams of activated carbon for super capacitors ("YP-50F"), 2.1 grams of ethylcellulose solution (5.7 wt. % ethylcellulose dissolved in a 10.3:1 blend of monoterpene alcohol ("TERPINEOL") and ethanol), 0.45 gram conductive carbon black ("SUPER P CONDUCTIVE CARBON BLACK"), 0.15 gram of fumed silica ("CABOSIL M5"), and 6.25 grams of monoterpene alcohol ("TERPINEOL") were mixed using a dual asymmetric centrifugal mixer (obtained under the trade designation "SPEEDMIXER DAC 150 SERIES" from FlackTek Inc., Landrum, S.C.) operated at 2500-3000 rounds per minute (rpm) until a uniform consistency was obtained, typically 3-5 minutes. The resulting composition was suitable for screen printing.

Preparative Example B (PE-B)

Preparation of Printable Electrode Ink-2

PE-B was prepared in the same manner as PE-A except that 2.34 grams of pseudocapacitive $MnO_2$, 1.66 gram of ethylcellulose solution (5.7 wt. % ethylcellulose dissolved in a 10.3:1 blend of monoterpene alcohol ("TERPINEOL") and ethanol), 0.45 gram of conductive carbon black ("SUPER P CONDUCTIVE CARBON BLACK"), 0.15 gram of fumed silica ("CABOSIL M5"), and 10 grams of monoterpene alcohol ("TERPINEOL") were mixed The resulting composition was suitable for screen printing.

The pseudocapacitive $MnO_2$ from above was synthesized by a conventional technique where aqueous solutions of $KMnO_4$ and manganese acetate are combined to precipitate $MnO_2$. To synthesize powder, 3.16 grams of $KMnO_4$ was dissolved in 120 mL of distilled water. Separately, 7.36 grams of $Mn(OAc)_2$ was dissolved in 200 mL of distilled water. The $KMnO_4$ solution was slowly added to the $Mn(OAc)_2$ solution, while stirring, using a buret, resulting in formation of a dark brown precipitate which was collected by centrifuging the dispersion, decanting clear liquid, and then drying the obtained solids. Once dried, the powder was passed through a 45 micrometer screen and then incorporated into ink formulations.

Preparative Example C (PE-C)

PE-C was prepared in the same manner as PE-A except that 3.2 grams of ethyl cellulose solution (5.7 wt. % ethylcellulose dissolved in a 10.3:1 blend of monoterpene alcohol ("TERPINEOL") and ethanol), 12 grams of calcined alumina ("AC34B4"), 0.12 gram of fumed silica ("CABOSIL M5"), and 5 grams of monoterpene alcohol ("TERPINEOL") were combined in a mixing cup containing about five 3.5 mm glass media balls and about ten 2 mm glass media balls, and mixed using a dual asymmetric centrifugal mixer ("SPEEDMIXER DAC 150 SERIES") operated at 2500-3000 rounds per minute (rpm) until a uniform consistency was obtained, typically 3-5 minutes. The resulting composition was suitable for screen printing.

Preparative Example D (PE-D)

A $MnO_2$ electrode ink for use in a printed battery was prepared by mixing 24.1 grams of conductive carbon ink ("PF-407C"), 79.6 grams of $MnO_2$, 1.6 gram $H_2O$, and 15.4 grams of diacetone alcohol in a dual asymmetric centrifugal mixer. Once uniform, the mixture was suitable for screen printing.

Preparative Example E (PE-E)

A Zn electrode ink for use in a printed battery was prepared by mixing 31.0 grams of conductive carbon ink ("PF-407C"), 35.7 grams of Zn powder, and 3.71 grams of diacetone alcohol. Once uniform, the mixture was suitable for screen printing.

Example 1 (EX1)

Construction of a symmetric activated carbon electrochemical capacitive device.

Step 1—Deposition of First Current Collector

A 0.002 inch (about 50 micrometer) thick heat stabilized polyethylene terephthalate ((PET); obtained from E.I. du Pont de Nemours and Company, Wilmington Del.) sheet was placed onto the vacuum stage of a screen printer (obtained under the trade designation "FORSLUND"; Model 77", from Hutchinson Industrial Corporation, Hutchinson, Minn.). A conductive silver ink ("479SS") was printed onto the PET surface using a first printing screen (obtained from Sefar, Inc., Buffalo, N.Y.). This screen consisted of a polyester mesh (marketed by Sefar, Inc. under the trade designation "SEFAR PET 1500 YELLOW") and solvent compatible emulsion (marketed by Sefar, Inc. under the trade designation "E-80"). Screen characteristics included a 61 threads per centimeter mesh, 20 micrometer emulsion over mesh thickness, 90 micrometer mesh opening, 30.1% open area, 64 micrometer thread diameter, and 22.5° mesh angle. The screen was designed such that the printed deposit was in the form of a rectangle measuring 28 millimeter×15 millimeter with connected rectangular tab measuring 8 millimeter×11 millimeter. A 70 durometer polyurethane squeegee with a square edge was used. The squeegee speed was about 7.5 cm/sec with angle of about 70° with respect to the print bed. The resulting wet ink deposit was dried at about 70° C. until a uniform matte appearance was observed.

Step 2—Deposition of First Conductive Barrier Layer

The substrate from Step 1 above with printed current collector was placed onto the vacuum stage of the screen printer as configured in Step 1. Using the screen from Step 1, a conductive carbon ink ("PF-407C"), was printed in registry to the silver layer (i.e., large rectangular region and rectangular tab from Steps 1 and 2 were aligned directly on top of one another) and dried at about 70° C. until a uniform matte appearance was observed. The resulting layered structure exhibited increased electrochemical stability compared to the current collector of Step 1.

Step 3—Deposition of First Electrode

The layered structure from Step 2 above was placed onto the vacuum stage of the screen printer as configured in Step 1. A second printing screen (obtained from Sefar, Inc.) was designed such that the printed deposit was in the form of a rectangle measuring 25 millimeter×13 millimeter. This screen consisted of a polyester mesh ("SEFAR PET 1500 YELLOW") and solvent compatible emulsion ("E-80"). Screen characteristics included a 33 threads per centimeter (83 threads per inch) mesh, 20 micrometer emulsion over mesh thickness, 209 micrometer mesh opening, 44.5% open area, 100 micrometer thread diameter, and 22.5° mesh angle. The printable electrode ink of PE-A was printed in registry to the existing current collectors of Step 2 (i.e., concentric to the larger rectangular portion of Steps 1 and 2 and sharing the same longitudinal axis), resulting in a printed layered structure with first printed electrode layer. After printing, the wet ink deposit was dried at about 70° C. until a uniform matte appearance was observed.

Step 4—Deposition of Separator

The layered structure from Step 3 above was placed onto the vacuum stage of the screen printer as configured in Step 1. A third printing screen (obtained from Sefar, Inc.) was designed such that the printed deposit was in the form of a rectangle measuring 30 millimeter×18 millimeter. This screen consisted of a polyester mesh ("SEFAR PET 1500 YELLOW") and solvent compatible emulsion ("E-80"). Screen characteristics included 33 threads per centimeter (83 threads per inch) mesh, 20 micrometer emulsion over mesh thickness, 209 micrometer mesh opening, 44.5% open area, 100 micrometer thread diameter, and 22.5° mesh angle. The printable separator ink of PE-C was printed in registry to the layered structure of Step 3 (i.e., concentric to the rectangular electrode layer and sharing the same longitudinal axis) resulting in a printed layered structure with printed separator layer. The wet ink deposit was dried at about 70° C. until a uniform matte appearance was observed. Five print-dry iterations produced an electrically insulating, porous particulate separator layer free of pinholes and cracks.

Step 5—Deposition of Second Electrode

The layered structure from Step 4 above was placed onto the vacuum stage of the screen printer as configured in Step 1. Using the screen described in Step 3, the printable electrode ink of PE-A was printed in registry to the layered structure of Step 4 (i.e., concentric to the rectangular separator layer from Step 4 and sharing the same longitudinal axis) resulting in a printed layered structure with a second printed electrode layer. After printing, the wet ink deposit was dried at about 70° C. until a uniform matte appearance was observed.

Step 6—Deposition of Second (Patterned) Conductive Barrier Layer

The layered structure from Step 5 above was placed onto the vacuum stage of the screen printer as configured in Step 1. Using the screen characteristics described in Step 1, a fourth printing screen (obtained from Sefar, Inc.) was designed such that the printed deposit was in the form of a rectangle measuring 28 millimeter by 15 mm inch where a concentric inner rectangular region measuring 23 millimeter×10 millimeter consisted of a hexagonal mesh (1 millimeter open hexagons with 1 millimeter printed line width). The printed feature also included a connected rectangular tab measuring 8 millimeter×10 millimeter. A conductive carbon ink ("PF-407C") was printed in registry to the layered structure of Step 5 (i.e., the larger rectangular feature was concentric to the second printed electrode layer, these two layers sharing the same longitudinal axis, and the connected tab orientated 180° from the tabs in Steps 1 and 2 from above) resulting in a printed layered structure with second printed (patterned) conductive barrier layer that provided open, liquid permeable regions and connected, electrically conductive regions upon drying. The wet ink deposit was dried at about 70° C. until a uniform matte appearance was observed.

Step 7—Deposition of Second (Patterned) Current Collector

The layered structure from Step 6 above was placed onto the vacuum stage of the screen printer as configured in Step 1. Using the screen described in Step 6, a conductive silver ink ("479SS") was printed in registry to the layered structure of Step 6 (i.e., the larger rectangular region and rectangular tab were aligned directly on top of those from Step 6) resulting in a printed layered structure with second printed (patterned) current collector. The final layered structure was then dried at about 120° C. for about 10 minutes.

Example 2 (EX2)

The layered structure of EX1 Step 7 was infiltrated with aqueous electrolyte by submerging the structure in a solution of 2M $KNO_3$ containing 0.05 wt. % surfactant ("SILWET L-77"). After 2-50 hours the electrolyte had entered the porous electrode and separator layers.

Example 3 (EX3)

EX3 was prepared in the same manner as EX2, except that the electrolyte was 2M $KNO_3$ containing 0.1 wt. % detergent ("ALCONOX").

Example 4 (EX4)

EX4 was prepared in the same manner as EX2, except that the electrolyte was 2M $KNO_3$ containing 0.05 wt. % surfactant ("SILWET L-77") and 0.05 wt. % detergent ("ALCONOX").

Example 5 (EX5)

The layered structure of EX1 Step 7 was infiltrated with an organic electrolyte (1M tetraethylammonium tetrafluoroborate (99+%; obtained from Alfa Aesar, Ward Hill, Mass.) in propylene carbonate (99+%; obtained from Alfa Aesar)) by contacting the electrolyte solution to the top surface of the layered structure with a pipette. After less than 10 minutes the electrolyte had entered the porous electrode and separator layers.

Example 6 (EX6)

Figure 3:
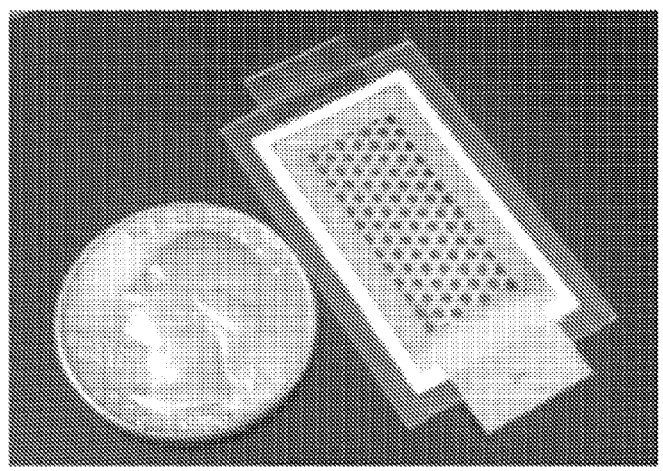
FIG. 3 is a photograph of the Example 1 electrochemical device.

To prepare EX6, substrate material extending beyond printed regions was removed from the layered structure such as that obtained from EX1 Step 7. The layered structure was infiltrated with electrolyte and then interposed between two sheets of a polyester (PET) base film with heat sealable ethylene vinyl acetate (EVA) ("SCOTCHPAK HB-P-69731 TRANSLUCENT HIGH BARRIER FILM") and placed onto a stainless steel plate. An aluminum die was heated to about 180° C. and pressed onto the stack, sealing the perimeter of the infiltrated layered structure. A photograph of a packaged device as described is shown in FIG. 3.

Figure 4:
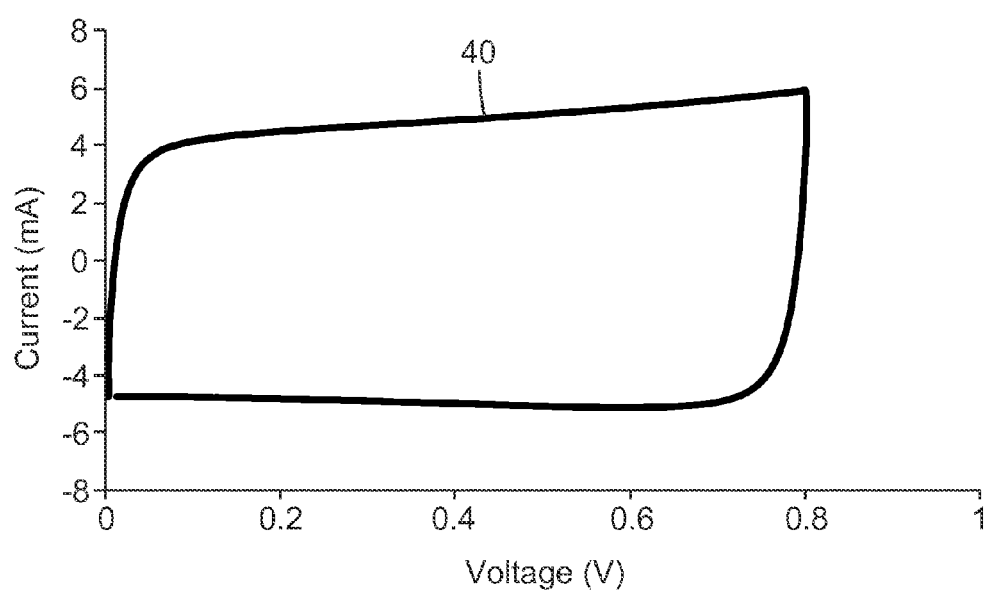
FIG. 4 is a cyclic voltammogram of the Example 6 electrochemical device.
Figure 5A:
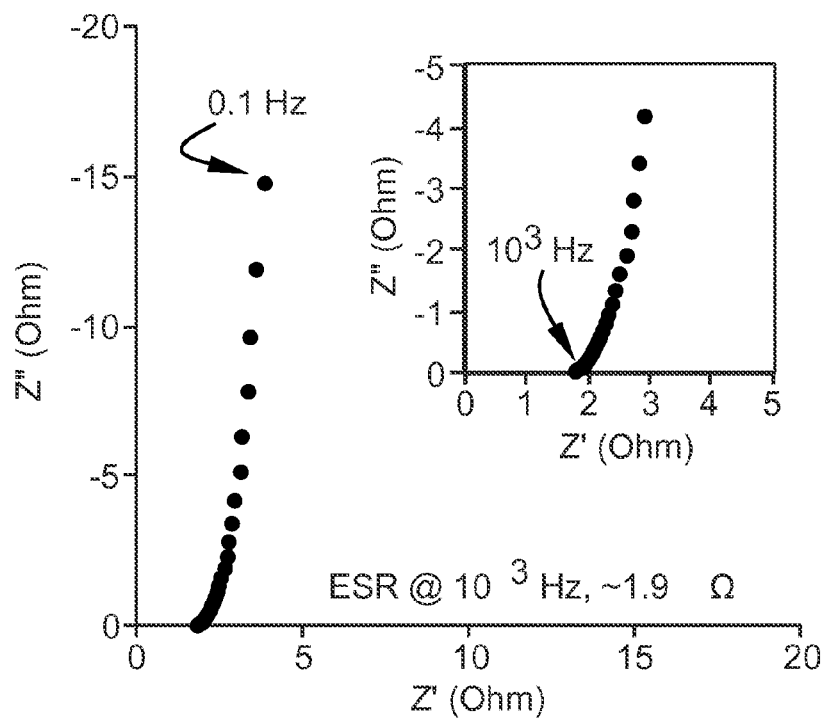
FIGS. 5A and 5B show electrochemical impedance spectroscopy data for the Example 6 electrochemical device.
Figure 5B:
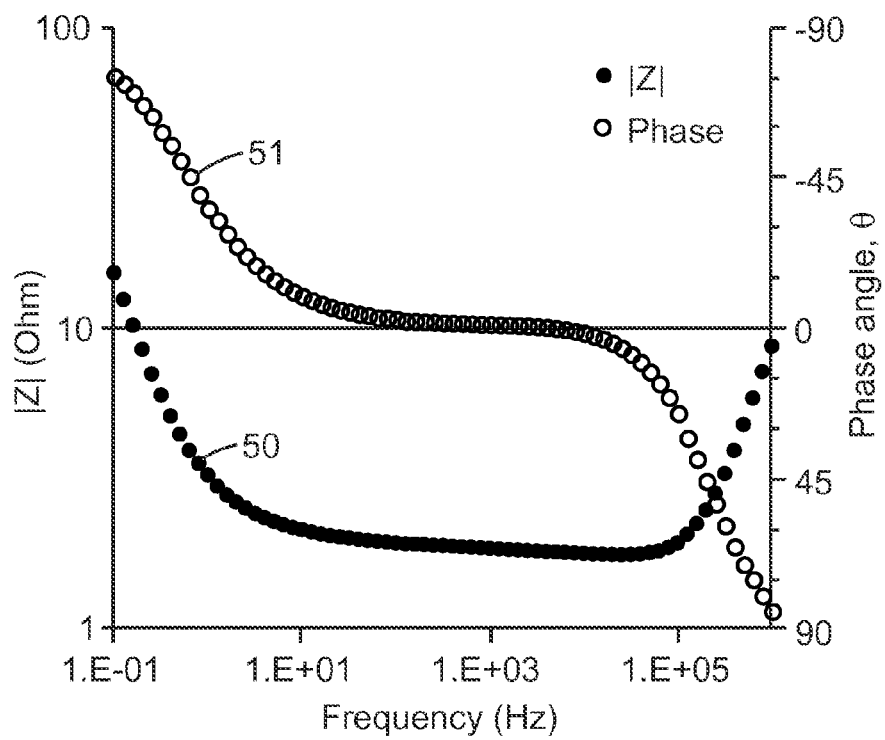

The packaged device of EX6 was tested using cyclic voltammetry and electrochemical impedance spectroscopy techniques. A potentiostat (obtained under the trade designation "SOLARTRON"; Model 1287A from Ametek Inc., Berwyn, Pa.), was used to record a cyclic voltammogram, curve 40 shown in FIG. 4, from 0 V to 0.8 V at scan rate of 40 mV/s. The rectangular shape of the curve demonstrates capacitive response with device capacitance of about 100 mF. Electrochemical impedance spectroscopy data, shown in FIGS. 5A and 5B, was collected over a frequency range of $1 \times 10^6$ Hz to 0.1 Hz using a frequency response analyzer (obtained under the trade designation "SOLARTRON"; Model 1255B from Ametek Inc.). Referring to FIG. 5B, curve 50 illustrates the change in impendence as a function of frequency. Referring to FIG. 5B, curve 51 illustrates the change in phase angle as a function of frequency. An equivalent series resistance of 1.9Ω was measured at 1000 Hz.

Example 7 (EX7)

A pseudocapacitive device was prepared by following the steps described in EX1 where the electrode ink deposited during Step 3 was replaced by an ink containing a pseudocapacitive material, such as the $MnO_2$ containing ink described in PE-B.

Example 8 (EX8)

A battery was prepared by following the steps described in EX1 except the inks deposited in Steps 3 and 5 were those described in PE-D and PE-E, respectively. The layered structure was then infiltrated by submerging the structure in an electrolyte solution of 1:1 by weight mixture of $ZnCl_2$ and water that contained 0.05 wt. % surfactant ("SILWET L-77"). After less than 50 hours electrolyte had entered the electrode and separator layers. An open circuit voltage>1.5V was measured.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. An electrochemical device comprising a configuration of layers comprising at least one combination, wherein each combination comprises a porous particulate separator layer disposed between a first porous electrode layer and a second porous electrode layer, and optionally at least one particulate current collector layer, and a liquid electrolyte, wherein all the combinations, optional particulate current collector layers, and liquid electrolyte are encased in a package, and wherein essentially all the liquid electrolyte is confined within the configuration of layers, and wherein the liquid electrolyte comprises water, acetonitrile, or propylene carbonate;

further comprising a second current collector on the second porous electrode layer, and wherein at least one of the first or second current collectors is patterned with open regions to enable infiltration of the liquid electrolyte into the porous layers.

2. The electrochemical device of claim 1 having only one combination encased in the package.

3. The electrochemical device of claim 1 having at least two of the combinations encased in the package.

4. The electrochemical device of claim 1, wherein the configuration of layers has an outer major surface, wherein the package has an inner major surface, and wherein at least 90 percent of the outer major surface of the configuration of layers is adhered to the adjacent inner major surface of the package.

5. The electrochemical device of claim 1, wherein there is essentially no free space within the package.

6. The electrochemical device of claim 1 further comprising a substrate, wherein the substrate forms the package.

7. The electrochemical device of claim 1, further comprising at least one current collector.

8. The electrochemical device of claim 1, wherein at least one combination is a capacitive cell.

9. A method of making an electrochemical device comprising a configuration of layers comprising at least one combination, wherein each combination comprises a porous particulate separator layer disposed between a first porous electrode layer and a second porous electrode layer, and optionally at least one particulate current collector layer, and a liquid electrolyte, wherein all the combinations, optional particulate current collector layers, and liquid electrolyte are encased in a package, and wherein essentially all the liquid electrolyte is confined within the configuration of layers, the method comprising:

printing a first porous electrode layer;

printing a porous particulate separator onto the first porous electrode layer;

printing a second porous electrode layer onto the porous particulate separator; and infiltrating the first and second porous electrode layers and porous particulate separator with liquid electrolyte, wherein the method further comprises encasing at least the first and second porous electrode layers, porous particulate separator, and the liquid electrolyte in a package.

10. The method of claim 9, further comprising printing a second current collector onto the second porous electrode layer prior to infiltrating the first and second porous electrode layers and porous particulate separator with the liquid electrolyte, and wherein at least one of the first or second current collectors is patterned with open regions to enable infiltration of the liquid electrolyte into the porous layers.

11. An electrochemical device comprising a configuration of layers comprising at least one combination, wherein each combination comprises a porous particulate separator layer disposed between a first porous electrode layer and a second porous electrode layer, and at least one particulate current collector layer, and a liquid electrolyte, wherein all the combinations, particulate current collector layers, and liquid electrolyte are encased in a package, and wherein essentially all the liquid electrolyte is confined within the configuration of layers, wherein the liquid electrolyte comprises water, acetonitrile, or propylene carbonate, and wherein at least one particulate current collector layer comprises patterned openings.

* * * * *

UNITED STATES PATENT AND TRADEMARK OFFICE
CERTIFICATE OF CORRECTION

| | | |
|---|---|---|
| PATENT NO. | : 10,454,088 B2 | Page 1 of 1 |
| APPLICATION NO. | : 14/654071 | |
| DATED | : October 22, 2019 | |
| INVENTOR(S) | : Budd et al. | |

It is certified that error appears in the above-identified patent and that said Letters Patent is hereby corrected as shown below:

On the Title Page

Item (74), Column 2 (Attorney Agent, or Firm):
Line 1, Delete "Qing" and insert -- Qiang --, therefor.

Signed and Sealed this
Sixteenth Day of June, 2020

Andrei Iancu
*Director of the United States Patent and Trademark Office*